United States Patent [19]

Schroeder et al.

[11] 4,346,617
[45] Aug. 31, 1982

[54] GROUND DRIVE CONTROL

[75] Inventors: Philip W. Schroeder, Derby; Edgar K. Lindstrom, Wichita, both of Kans.

[73] Assignee: J. I. Case Company

[21] Appl. No.: 163,553

[22] Filed: Jun. 27, 1980

[51] Int. Cl.³ .................. G05G 11/00; G05G 1/14
[52] U.S. Cl. .................................................. 74/481
[58] Field of Search ................. 74/474, 481, 482, 850

[56] References Cited

U.S. PATENT DOCUMENTS

| 3,316,773 | 5/1967 | Findlay | 74/481 |
| 3,541,878 | 11/1970 | Haffner | 74/474 |
| 4,040,306 | 8/1977 | Jensen | 74/481 X |
| 4,217,789 | 8/1980 | Larson | 74/482 X |
| 4,237,752 | 12/1980 | Hildebrecht | 74/474 X |

FOREIGN PATENT DOCUMENTS 1497770  1/1978  United Kingdom .................. 74/474

Primary Examiner—Allan D. Herrmann
Attorney, Agent, or Firm—Cullen, Sloman, Cantor, Grauer, Scott & Rutherford

[57] ABSTRACT

A drive control is disclosed which is particularly useful for machines having a hydrostatic transmission or ground drive pump, such as a tractor. A shift assembly controls the input to the hydrostatic transmission, and it includes a shift lever which is movable by a bellcrank mechanism in opposite directions from a neutral position into forward or reverse. The drive control further includes a rocking foot pedal which is connected by an actuating linkage to both the shift lever and the hydrostatic transmission. The desired direction of operation is set with the shift assembly, and the speed of movement in the selected direction is proportional to the amount the foot pedal is depressed. The foot pedal assembly includes a heel tab actuator which can be used as a manual override for the purpose of braking by bringing the hydrostatic transmission back to neutral while maintaining the transmission in the selected directional position. An automatic override mechanism is also provided such that when the foot pedal is released, for any reason, the automatic override mechanism returns the hydrostatic transmission to neutral without affecting the directional position setting. A further feature of the invention resides in the selector plate for directional control which includes a projection for actuating a neutral start switch.

4 Claims, 3 Drawing Figures

GROUND DRIVE CONTROL

BACKGROUND OF THE INVENTION

The present invention relates to machines having a hydrostatic transmission or ground drive pump such as a tractor, and more particularly, to a drive control having a combined rocking foot pedal assembly and shift assembly for effecting forward and reverse motion of the machine.

It is conventional to provide tractors and similar machines with hydrostatic transmissions for controlling the speed, direction, and pulling power of the tractor. The transmission is typically provided with a rotatable shift arm or lever which may be rotated in one direction for forward motion of the tractor and in the opposite direction for rearward or reverse motion. The speed of the tractor is proportional to the rotation of the shift arm while the tractor engine is operated at a speed set by a conventional throttle device.

Tractors of this type have also been provided with a rotatable control lever which may be indirectly connected to a rocking foot pedal so that the control lever is rotated in one direction when the pedal is rocked forward for forward motion of the machine and is rotated in the opposite direction when the pedal is rocked rearward for reverse motion of the machine. The speed of the tractor is proportional to the amount the foot pedal is depressed.

A problem with these prior art constructions is that they do not include a mechanism which will permit the control lever of the transmission to remain in a selected position during braking. That is, the control lever is shifted to neutral either manually or automatically whenever the brake is applied, and the control lever must again be shifted to the desired forward or reverse position before proceeding after braking.

This problem is solved in the combined rocking foot pedal assembly and shift assembly of this invention which maintains the control shift lever in a selected position, regardless of foot pedal movement. The present invention permits the shift lever to be maintained in a selected position when manual or automatic operation of the foot pedal occurs, so that the operator is not required to shift into the desired forward or reverse position before proceeding again.

SUMMARY OF THE INVENTION

As described above, the drive control including the combined foot pedal assembly and shift assembly of this invention is particularly adapted to machines having a hydrostatic transmission or ground drive pump, such as a tractor. The shift assembly controls the input to the hydrostatic transmission, and it includes a shift lever which is movable by a bellcrank mechanism in opposite directions from a neutral position into forward or reverse. The drive control in the disclosed embodiment further includes a rocking foot pedal assembly which is connected by an actuating linkage to both the shift lever and the hydrostatic transmission. In operation, the desired direction of movement is set with the shift assembly, and the speed of movement in the selected direction is proportional to the amount the foot pedal is depressed.

The shift assembly in a preferred embodiment includes a rotatable selector plate which is fixed to the rotatable control shaft from the hydrostatic transmission. The selector plate includes a slot having detent positions for forward, neutral and reverse directional control. The actuating linkage, which interconnects the shift lever and foot pedal, has a free end that is connected to and movable within the slot in the selector plate. When the shift lever is moved into a directional position by the bellcrank mechanism, the actuating linkage is simultaneously moved to a respective detent position in the selector plate to establish the selected direction of movement for the machine. Thereafter, depression of the foot pedal further strokes the hydrostatic transmission such that the speed of movement in the selected direction is proportional to the amount the foot pedal is depressed.

The foot pedal assembly includes a heel tab actuator for the purpose of braking by bringing the hydrostatic transmission back to neutral while maintaining the transmission in the selected directional position. As described, after the direction of machine movement is set at the selector plate, the foot pedal may be depressed for increasing the speed of the machine in the selected direction. If braking is desired, the operator steps on the heel tab actuator thereby providing a manual override for rotating the transmission control shaft towards its neutral position. This manual braking occurs without changing the selected directional position. Thereafter, the operator may again depress the foot pedal and proceed in the direction originally selected.

An automatic override mechanism is also provided which includes a double acting mechanism that is directly connected to the control shaft of the hydrostatic transmission. When the foot pedal is released, for any reason, the double acting mechanism returns the hydrostatic transmission towards neutral automatically. This insures that the speed of the machine in either forward or reverse cannot be increased unless the foot pedal is depressed. As with the manual override provided by the foot pedal heel tab, the automatic override does not affect the directional position setting.

A further feature of the present invention resides in the selector plate which includes a projection for actuating a neutral start switch. The machine can only be started when the directional selector plate is set at neutral. In this setting, the projection of the plate closes the neutral start switch thereby permitting the engine of the machine to be started.

Other advantages and meritorious features of the present invention will be more fully understood from the following description of the preferred embodiment, the appended claims, and the drawings, a brief description of which follows.

DESCRIPTION OF THE PREFERRED EMBODIMENT

Figure 1:
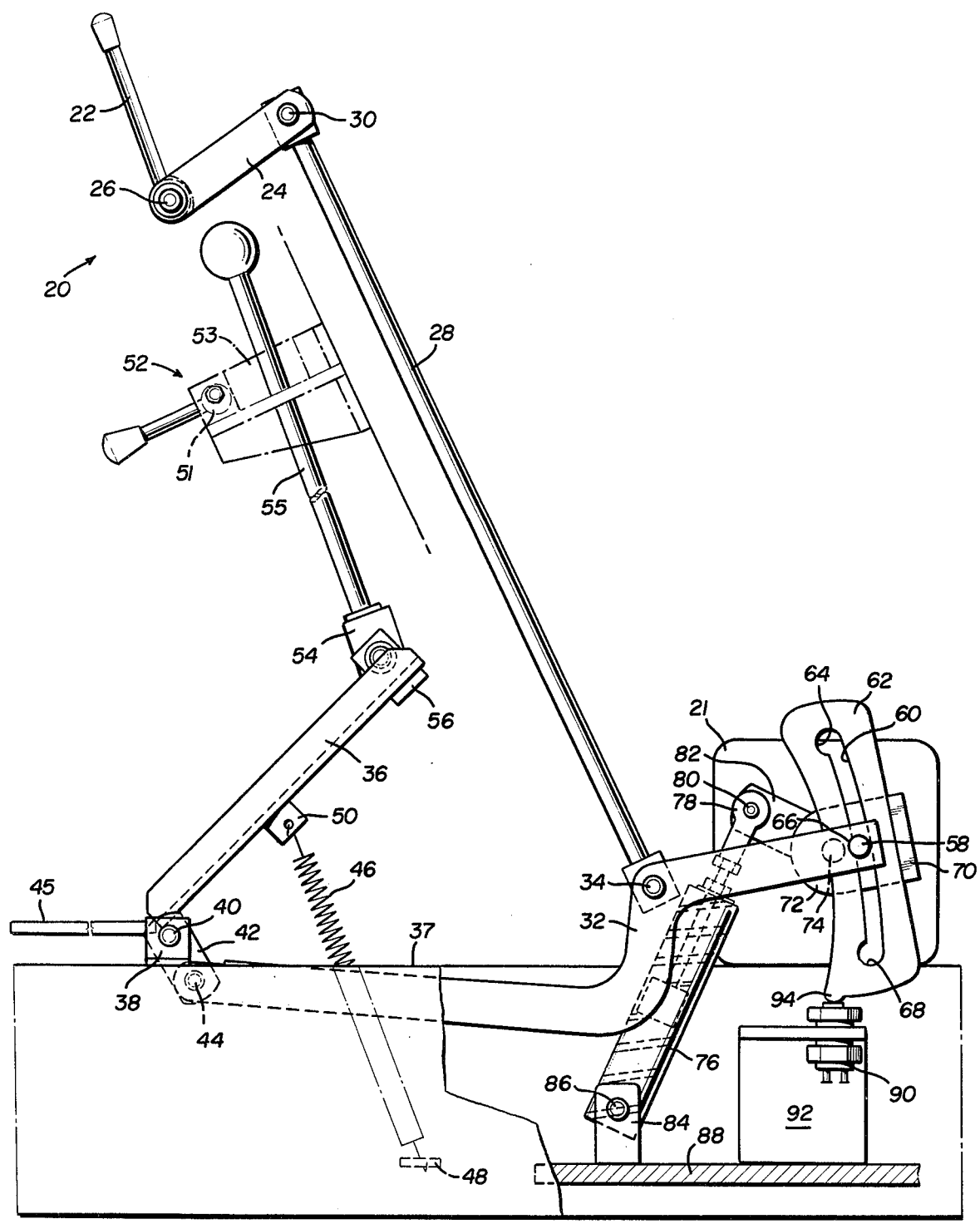
FIG. 1 is a side elevational view of the drive control including the combined foot pedal assembly and shift assembly.
Figure 2:
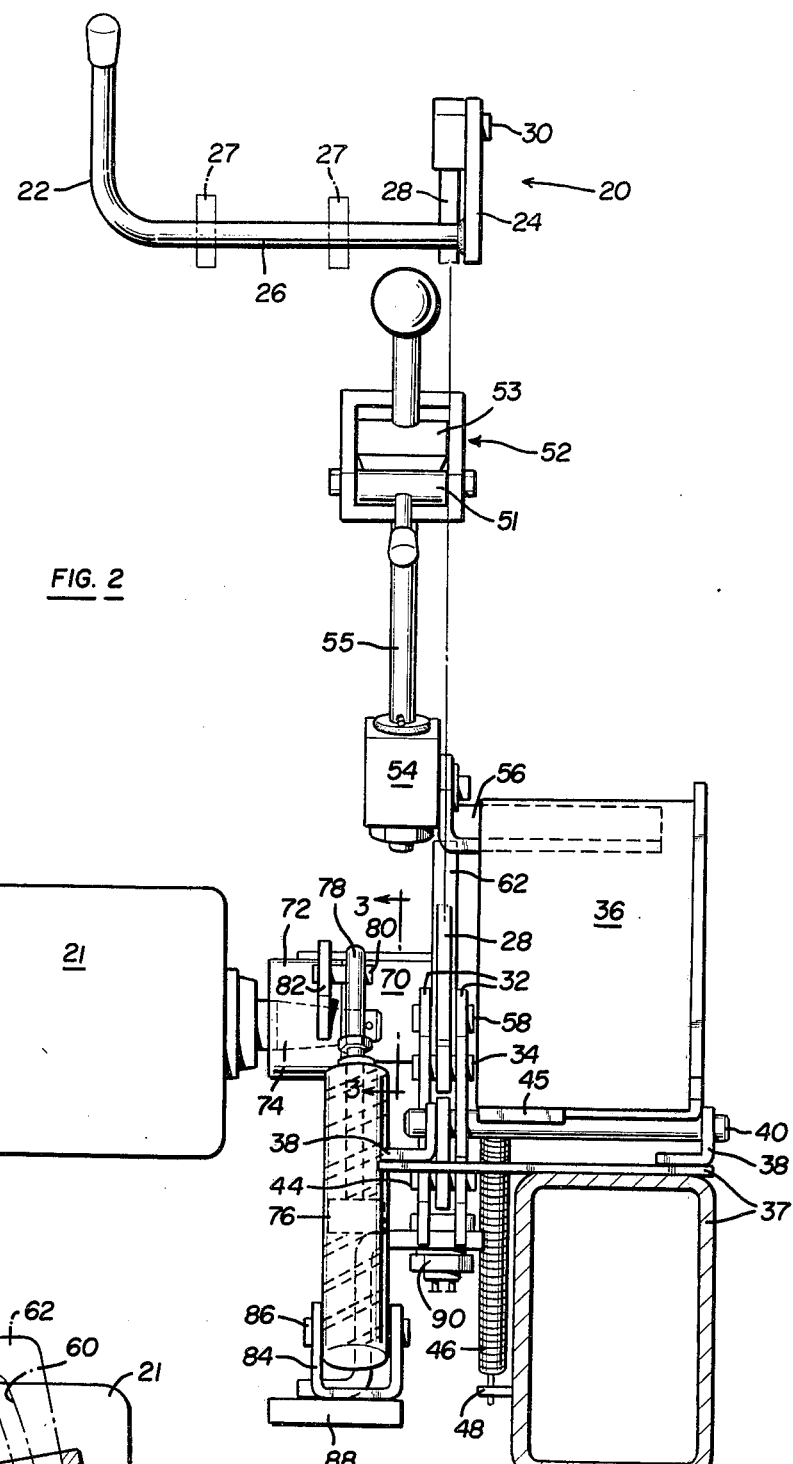
FIG. 2 is an end view of the drive control of the present invention.
Figure 3:
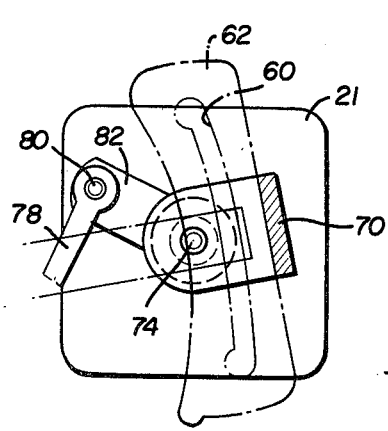
FIG. 3 is a cross sectional view taken along line 3—3 of FIG. 2.

As previously described, the drive control mechanism of this invention includes a combined foot pedal assembly and shift assembly for effecting forward and reverse motion of the machine. In the disclosed embodiment, a shift assembly 20 is provided for a tractor or the like having a hydrostatic transmission or ground drive pump 21. Shift assembly 20 includes a bellcrank mechanism comprising handle 22 and crank member 24 which is pivotally mounted to the machine frame (not shown) by mounting pivot arm 26 in bearing blocks 27. A shift lever 28 is pivotally attached at one of its ends to crank member 24 by pivot pin 30 and pivotally attached at its other end to actuating linkage 32 by pivot pin 34. Shift lever 28 is movable by bellcrank mechanism 22, 24 in opposite directions from a neutral position as shown in FIGS. 1 and 2 into forward or reverse.

The drive control mechanism further includes a foot pedal assembly consisting of a foot pedal 36 for controlling the speed of machine movement in either the forward or reverse direction. Brackets 38 are welded or otherwise secured to support frame 37, and the transverse pivot pin 40 pivotally supports pedal 36. A depending pivot link 42 is fixed to foot pedal 36 and is pivotally secured to a pair of actuating links 32 by pivot pin 44. A heel tab actuator 45 is also fixed to foot pedal 36 for the purpose of braking, as will be described.

In operation, the desired direction of movement is set by shifting lever 28 with bellcrank mechanism 22, 24. Thereafter, the speed of movement in either the forward or reverse direction is proportional to the amount the foot pedal 36 is depressed.

Foot pedal 36 is spring biased clockwise by spring 46 which is mounted between frame bracket 48 and foot pedal bracket 50. Spring 46 applies constant tension on actuating linkage 32 through pivot link 42 from foot pedal 36 for holding the actuating linkage locked in the selected directional position. A pedal locking mechanism 52 is also provided, and it is connected at one of its ends to foot pedal 36 by coupling 54 and bracket 56. The pedal locking mechanism may be used to hold the foot pedal depressed at various positions for holding the speed of the machine constant. This is accomplished by the selective locking engagement between eccentric cam lock 51 and locking block 53 as illustrated in FIG. 1 which clamps rod 55 in any desired position. The pedal locking mechanism 52 is illustrated for the purpose of completely showing the structural connections to pedal 36, but it does not form any part of the present invention.

The shift assembly in a preferred embodiment includes a rotatable directional selector plate 62 which has a slot 60 with detent positions 64, 66, 68 for reverse, neutral, and forward directional control, respectively. The actuating linkage 32, which interconnects shift lever 28 and foot pedal 36, has one end that straddles plate 62 and is connected thereto by clevis pin 58. Pin 58 is shown at the neutral detent position 66 in FIGS. 1 and 2, and it is movable in slot 60 from the neutral position to either the reverse direction position 64 or the forward direction position 68 in response to the shifting of lever 28.

The movement of pin 58 in slot 60 shifts plate 62 into either forward or reverse. Rotatable selector plate 62 is mounted to a coupling assembly 72 which is fixed to the rotatable pintle control shaft 74 of hydrostatic transmission 21. Thus, when shift lever 28 is moved into a directional position by the bellcrank mechanism 22, 24, pin 58, at end of actuating linkage 32, is simultaneously moved to a corresponding detent position in plate 62 thereby establishing the selected direction of movement for the machine. Pin 58 is held in the selected detent position by the biasing force of spring 46 on linkage 32. Thereafter, depression of foot pedal 36 further strokes hydrostatic transmission to increase the speed of movement in the selected direction.

As described, the foot pedal 36 includes a heel tab actuator 45 for the purpose of braking by rotating hydrostatic transmission control shaft 74 back towards neutral while maintaining actuating linkage 32 in the selected directional position. That is, the direction of machine movement is set at selector plate 62 by shift lever 28 that raises and lowers the end of linkage 32, moving pin 58 in slot 60 to one of the detent positions 64, 66, 68. Foot pedal 36 may then be depressed for pulling on the end 44 of linkage 32 thereby further rotating control shaft 74 through coupling assembly 72 and increasing the speed of the machine in the selected direction. If braking is desired, the operator steps on the heel tab actuator 45 thereby pushing on linkage 32 and providing a manual override for rotating transmission control shaft 74 towards its neutral position. This manual braking occurs without changing or affecting the directional position set at selector plate 62. After braking, the operator may again depress foot pedal 36 and proceed in the direction originally selected.

An automatic override mechanism is also provided which includes a double acting spring-type mechanism 76 that has one end 78 which is connected to coupling assembly 72 by pin 80 and bracket 82. The other end of double acting mechanism 76 is connected to frame support plate 88 by bracket 84 and pin 86. When foot pedal 36 is released, for any reason, double acting mechanism 76 automatically rotates transmission control shaft 74 clockwise or counterclockwise towards its neutral position, depending on the directional setting at the selector plate 62. Double acting mechanism 76 insures that the speed of the machine in either forward or reverse cannot be increased unless foot pedal 36 is depressed. The automatic override provided by mechanism 76 does not affect the directional position set at selector plate 62.

Another feature of the present invention resides in selector plate 62 which includes an actuator 94 at its one end for actuating neutral start switch 90 that is mounted on bracket support 92. The machine can only be started when selector plate 62 is set at neutral as shown in FIGS. 1 and 2. When selector plate 62 is at neutral, actuator 94 closes start switch 90 thereby permitting the engine of the machine to be started.

Referring to FIGS. 1 and 2 which illustrate the hydrostatic transmission set at neutral, the operation of the drive control of this invention will be described. To shift the transmission into forward, the operator pulls upward on handle 22 which rotates crank member 24 clockwise to push downwardly on shift lever 28. This causes pin 58 of actuating linkage 32 to be shifted in slot 60 of selector plate 62 to the forward direction detent position 68 which sets hydrostatic transmission 21 for propelling the machine in a forward direction. Thereafter, depression of foot pedal 36 pulls on the end 44 of linkage 32 which rotates control shaft 74 clockwise thereby stroking transmission 21 to increase the speed of movement in the selected direction. If the operator releases foot pedal 36, double acting mechanism 76 automatically rotates transmission control shaft 74 counterclockwise towards neutral without changing the position of pin 58 in selector plate slot 60. Similarly, if the operator steps on heel tab actuator 45, the end 44 of linkage 32 is pushed thereby rotating control shaft 74 counterclockwise towards neutral which brakes the machine. This also occurs without changing the position of pin 58 in selector plate slot 60.

To shift the hydrostatic transmission 21 into reverse, the operator pushes downwardly on handle 22, and crank member 24 is rotated counterclockwise to pull upwardly on shift lever 28. Pin 58 of actuating linkage 32 is thus shifted in slot 60 to the reverse directional detent position 64 which sets hydrostatic transmission 21 for propelling the machine in a reverse direction. Depression of foot pedal 36 pulls on linkage 32 which rotates control shaft 74 counterclockwise to increase the speed of movement in the selected direction. The operations of automatic override 76 and manual override 45 in the reverse direction setting are the same as in the forward direction setting except control shaft 74 is rotated clockwise towards the neutral position without changing the position of pin 58 in selector plate slot 60.

It will be apparent to those skilled in the art that the foregoing disclosure is exemplary in nature rather than limiting, the invention being limited only by the appended claims.

We claim:

1. A ground drive control mechanism for a machine having a hydrostatic transmission, a transmission control means rotatable about one axis into forward, reverse, and neutral operating positions to control the input to said hydrostatic transmission, said ground drive control mechanism comprising:

shift means including a shift lever, said shift lever connected at one of its ends to actuating linkage and movable means connected to the other end of said shift lever, said shift lever being shiftable by said movable means from a neutral position into forward or reverse;

depressible foot pedal means for controlling the speed of the machine movement in a selected direction, said foot pedal means including a pivotal foot pedal and means for biasing said foot pedal in one direction, said actuating linkage interconnecting said shift lever and said foot pedal means;

rotatable selector means mounted to said transmission control means, said rotatable selector means including a selector plate having a slot with detent positions for forward, neutral and reverse directional control, pin means for slidably mounting one end of said actuating linkage within said selector plate slot and said pin means being selectively movable into one of said detent positions in response to movement of said shift lever thereby setting said transmission to propel the machine in a selected direction, said biasing means applying a constant tension on said actuating linkage for holding said pin means locked in the selected detent position;

manual override means including a heel tab actuator connected to said foot pedal, depression of said heel tab actuator moving said actuating linkage for rotating said transmission control means towards its neutral position without affecting the directional position setting at said selector plate; and automatic override means connected to said transmission control means, said automatic override means rotating said transmission control means towards its neutral position in response to the release of said foot pedal without affecting the directional position setting at said selector plate.

2. The ground drive control mechanism as defined in claim 1 wherein said shift means includes a bellcrank mechanism comprising a handle and crank member, said shift lever pivotally attached at its said other end to said crank member.

3. The ground drive control mechanism as defined in claim 1 wherein said automatic override means comprises a double acting spring type mechanism.

4. The ground drive control mechanism as defined in claim 1 wherein said selector plate includes an actuator at one of its ends which is engageable with a neutral start switch to close said switch thereby only permitting starting of the machine when said selector plate is set at its neutral position.

* * * * *